US007304229B2

(12) United States Patent
Chang

(10) Patent No.: US 7,304,229 B2
(45) Date of Patent: Dec. 4, 2007

(54) METHOD AND APPARATUS FOR KARAOKE SCORING

(75) Inventor: Pei-Chen Chang, Tainan (TW)

(73) Assignee: Mediatek Incorporated, Hsin-Chu (TW)

( * ) Notice: Subject to any disclaimer, the term of this patent is extended or adjusted under 35 U.S.C. 154(b) by 603 days.

(21) Appl. No.: 10/996,831

(22) Filed: Nov. 24, 2004

(65) Prior Publication Data

US 2005/0115383 A1 Jun. 2, 2005

(30) Foreign Application Priority Data

Nov. 28, 2003 (TW) .............................. 92133569 A

(51) Int. Cl.
*G09B 5/00* (2006.01)

(52) U.S. Cl. ........................ 84/610; 84/611; 434/307 A

(58) Field of Classification Search .................. 84/600, 84/609–611; 434/307 A
See application file for complete search history.

(56) References Cited

U.S. PATENT DOCUMENTS 5,434,949 A * 7/1995 Jeong .......................... 704/270
5,477,003 A * 12/1995 Muraki et al. .......... 434/307 A
5,525,062 A * 6/1996 Ogawa et al. .......... 434/307 A
5,557,056 A * 9/1996 Hong et al. .................... 84/610
5,563,358 A * 10/1996 Zimmerman .............. 84/477 R
5,565,639 A 10/1996 Bae
5,567,162 A * 10/1996 Park ........................ 434/307 A
5,693,903 A * 12/1997 Heidorn et al. ............... 84/668
5,715,179 A * 2/1998 Park ............................ 702/182
5,719,344 A * 2/1998 Pawate ......................... 84/609
5,804,752 A * 9/1998 Sone et al. .................... 84/610
5,889,224 A * 3/1999 Tanaka ......................... 84/645
6,073,100 A * 6/2000 Goodridge, Jr. ............ 704/258
6,326,536 B1 12/2001 Wang
6,495,747 B2 * 12/2002 Shimaya et al. .......... 84/477 R
6,609,979 B1 * 8/2003 Wada ........................... 463/43
2004/0231498 A1 * 11/2004 Li et al. ........................ 84/634
2006/0246407 A1 * 11/2006 Kang et al. ............. 434/307 A

FOREIGN PATENT DOCUMENTS

JP 8129392 5/1996
JP 11224094 A2 8/1999

* cited by examiner

*Primary Examiner*—Lincoln Donovan
*Assistant Examiner*—David S. Warren
(74) *Attorney, Agent, or Firm*—Hoffman, Warnick & D'Alessandro LLC

(57) ABSTRACT

A karaoke scoring apparatus includes a memory element, a feature extraction element, a similarity measurement element, and a scoring element. The karaoke system includes a reference audio input to be compared with a target audio input for giving a score. The reference audio input and the target audio input are sampled respectively and are transformed sequentially to plural frames of reference sampling signals and plural frames of target sampling signals. The memory element is used for storing the frame of reference sampling signal and the frame of target sampling signal. The feature extraction element is used for performing autocorrelation calculation on the frame of reference sampling signal and the frame of target sampling signal. The similarity measurement element is used for generating a similarity result. The scoring element is used for calculating the similarity results corresponding to the plural frames of sampling signals to output final score.

15 Claims, 3 Drawing Sheets

METHOD AND APPARATUS FOR KARAOKE SCORING

BACKGROUND OF THE INVENTION

1. Field of the Invention

The present invention relates to a karaoke scoring apparatus, especially to a karaoke scoring apparatus for evaluating the performance of a singer.

2. Description of the Prior Art

The karaoke scoring apparatus, which is generally installed in a karaoke system, is to evaluate the performance of a singer. The karaoke scoring apparatus generally would generate a score to indicate the singer's performance.

The conventional karaoke apparatus utilizes a musical sound player which reproduces karaoke music from a magnetic tape on which the karaoke music is recorded in the form of an analog audio signal. With the advance in electronics technology, the magnetic tape is replaced by a CD (Compact Disk) or an LD (Laser Disk). The audio signal recorded in a disk media is changed from analog to digital. The data recorded on these disks contains not only music data but also a variety of other items of data including image data and lyrics data.

Recently, communication-type karaoke apparatuses become popular, in which, instead of using the CD or the LD, music data and other karaoke data are delivered through a communication line such as a regular telephone line or an ISDN line. The delivered data is processed by a tone generator and a sequencer. These communication-type karaoke apparatuses include a non-storage type in which music data is delivered every time karaoke play is requested, and a storage-type in which the delivered music data is stored in an internal storage device such as a hard disk unit and read out from the internal storage device for karaoke play upon request. Currently, the storage-type karaoke apparatus is dominating the karaoke market mainly because of its lower running cost.

Some of the above-mentioned karaoke apparatuses have a karaoke scoring device designed to evaluate singing skill of a karaoke singer based on voice of the singer vocalized along with the accompaniment of karaoke music. The conventional karaoke scoring device detects pitch and level of the singing voice of the karaoke singer, and checks the detected pitch and level with respect to stability and continuity of live vocal performance for evaluation and scoring.

However, the evaluation and scoring by the conventional karaoke scoring device are made independently of tempo information and melody information contained in the karaoke music data. There is no correlation between the actual vocal performance and the accompanying karaoke music. In the conventional scoring device, the evaluation is made without any relationship with melody information and tempo information contained in the karaoke music data. Namely, the conventional scoring device simply evaluates only the way of singing of the karaoke singer regardless of regulated progression of the karaoke music. Therefore, the conventional karaoke scoring device cannot draw distinction between good singing performance well synchronized with karaoke accompaniment and poor singing made out of tune. The conventional scoring device can evaluate only physical voicing skill of a karaoke singer, and consequently cannot evaluate the singing skill in musical relationship with the melody information contained in the karaoke music data.

SUMMARY OF THE INVENTION

The objective of the present invention is to provide a karaoke scoring apparatus for scoring the performance of a singer.

Another objective of the present invention is to provide a karaoke scoring apparatus that has an appropriate scoring standard.

In an embodiment, the karaoke scoring apparatus is used with a karaoke system for scoring the performance of a singer. The karaoke system comprises a predetermined reference audio input, and it is capable of accepting a target audio input and comparing with the reference audio input to give a score by the karaoke scoring apparatus.

The karaoke scoring apparatus comprises a memory element, a feature extraction element, a similarity measurement element, and a scoring element.

The reference audio input and the target audio input are sampled respectively, and they are further transformed sequentially to plural frames of reference sampling signals and plural frames of target sampling signals.

The memory element is used for temporarily storing at least one frame of reference sampling signal and at least one frame of target sampling signal.

The feature extraction element is used for performing an autocorrelation calculation on the frame of reference sampling signal, temporarily stored in the memory element, and plural frames of reference sampling signals that are variably delayed to generate a set of reference characteristic values. The feature extraction element is also used for performing the autocorrelation calculation on the frame of target sampling signal, temporarily stored in the memory element, and plural frames of target sampling signals that are variably delayed to generate a set of target characteristic values.

The similarity measurement element is used for performing a similarity comparing procedure, according to the set of target characteristic values and the set of reference characteristic values, to generate a similarity result corresponding to the frame of reference sampling signal and the frame of target sampling signal.

The scoring element is used for calculating the similarity results corresponding to the plural frames of sampling signals to output a final score.

According to the embodiment, the karaoke scoring apparatus can retrieve the characteristics of the reference vocal input of the reference audio input, i.e. the vocal pitches of each frame of reference audio input, as the standard for scoring the target audio input. The karaoke scoring apparatus can further transform the extracted audio input to corresponding quantified characteristics to be compared in detail. Moreover, the karaoke scoring apparatus provides a reasonable scoring standard, so that when a singer sings with the karaoke system, there will be different scores corresponding to Hit, Miss, continual Hit, continual Miss in the pitches of each frame of audio input. Furthermore, depending on the different levels of continual Hit or continual Miss, the scores added or deducted will also be adjusted correspondingly. Therefore, the present invention provides a karaoke scoring apparatus for precisely scoring the performance of a singer in a karaoke system. Furthermore, the karaoke scoring apparatus of the present invention has a reasonable scoring standard.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
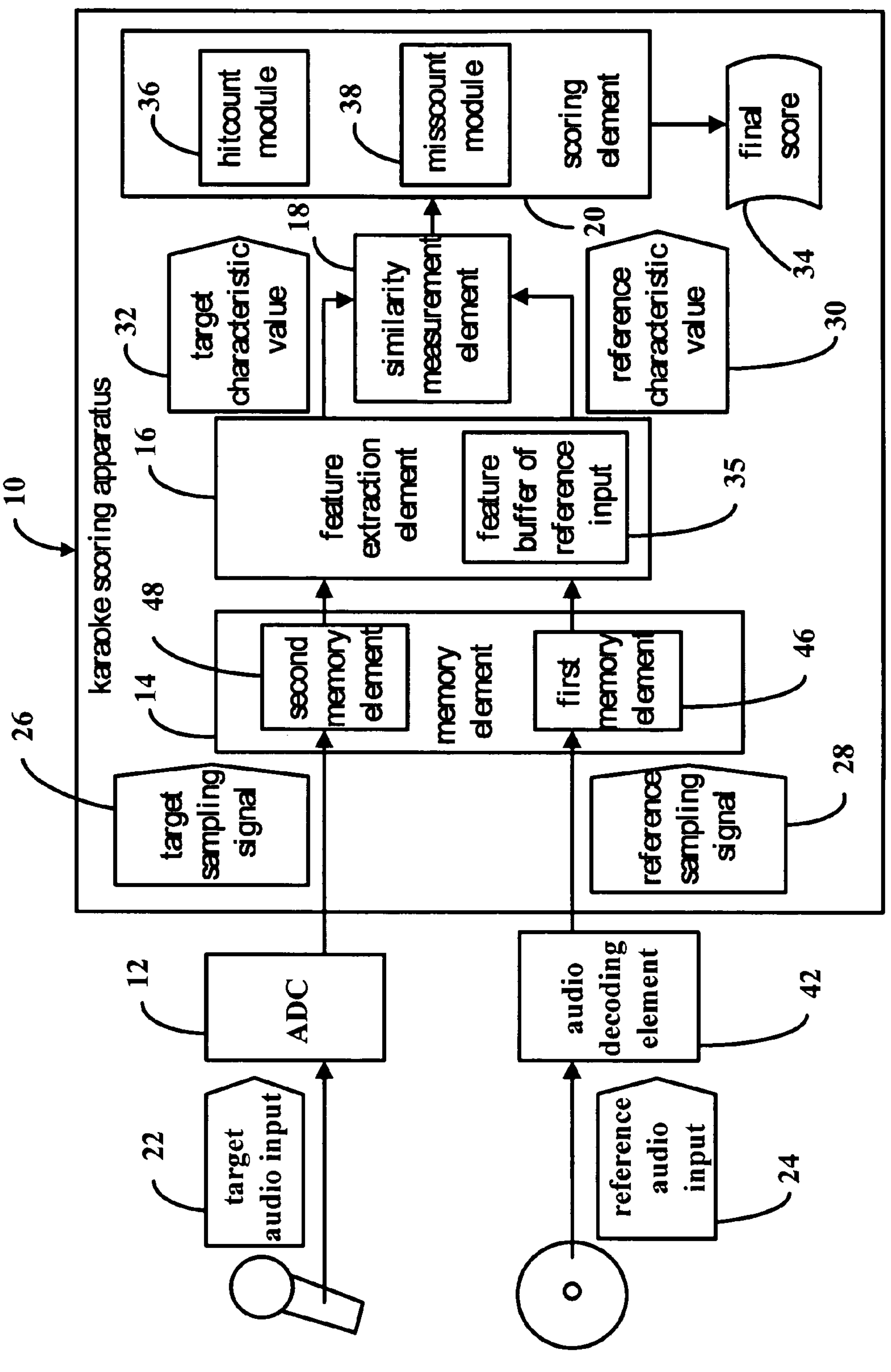
FIG. 1 is a schematic diagram of the karaoke scoring apparatus according to the embodiment.

Referring to FIG. 1, FIG. 1 is an embodiment of the karaoke scoring apparatus. As shown in FIG. 1, the karaoke scoring apparatus 10 comprises a memory element 14, a feature extraction element 16, a similarity measurement element 18, and a scoring element 20.

The karaoke scoring apparatus 10 is used for evaluating the performance of a singer, and could be installed in a karaoke system. When the singer sings a song with the karaoke system, the karaoke system detects the live vocal performance to extract therefrom sample data which is characteristic of actual voicing of the singer to be a target audio input 22. The karaoke scoring apparatus 10 compares the target audio input 22 with a predetermined reference audio input 24 to give a score indicating the singer's performance. The predetermined reference audio input 24 could be stored in the karaoke system.

The target audio input 22 is a target vocal input provided by the singer via a microphone or other audio input apparatus. The reference audio input 24 is synthesized by mixing a reference instrumental input and/or a reference vocal input, and the reference audio input 24 is the musical data provided by the karaoke system as accompanying music. In general, the reference audio input 24 can be stored in a storage device, such as a compact disk (CD), a tape, or a hard disk. The storage device could be installed in the karaoke system. For example, the accompaniment tape of the prior art only has the reference instrumental input without the reference vocal input. Some karaoke systems also utilize the CD comprising mixed reference vocal input and reference instrumental input for accompaniment. Furthermore, the improved accompaniment CD or DVD stores the reference vocal input and the reference instrumental input respectively for the convenience of the user.

In this embodiment, the target audio input 22 could be an analog signal. As shown in FIG. 1, an analog to digital converter (ADC) 12 is used for converting the target audio input 22 into corresponding digital signal for the convenience of calculation. Moreover, an audio decoding element 42 is used for decoding the reference audio input 24. The memory element 14 is used for temporarily storing at least one frame of target sampling signal 26 and at least one frame of reference sampling signal 28. The memory element 14 comprises a first memory element 46 and a second memory element 48. The first memory element 46 and the second memory element 48 may be a register or other storage element.

The audio decoding element 42 sequentially transforms the reference audio input 24 into plural frames of corresponding reference sampling signals 28, which are then stored in the first memory element 46. The ADC 12 samples the target audio input 22 according to the predetermined sampling frequency, sequentially transforms the target audio input 22 into plural frames of corresponding target sampling signals 26, and stores the plural frames of corresponding target sampling signals 26 in the second memory element 48.

Each frame of reference sampling signal 28 and each frame of target sampling signal 26 have N samples respectively. In this embodiment, N is equal to 1,024. As the above mentioned, each frame of sampling signal can be represented as X(k), wherein k=0~N−1, and it is able to be delayed as X(k+$\tau$) via different delay time $\tau$.

The feature extraction element 16 performs an autocorrelation calculation on the frame of reference sampling signal 28, X(k), temporarily stored in the memory element 14, and the plural frames of reference sampling signals 28, X(k+$\tau$), that are variably delayed. The autocorrelation calculation performs a predetermined calculation on X(k) and X(k+$\tau$) to obtain an autocorrelation function $r_{xx}(\tau)$; the predetermined calculation is:

$$r_{xx}(\tau) = \frac{1}{N}\sum_{k=0}^{N-1} x(k)\cdot x(k+\tau)$$

The feature extraction element 16 is also used for performing the autocorrelation calculation on the frame of target sampling signal 26, temporarily stored in the memory element 14, and the plural frames of target sampling signals 26 that are variably delayed.

When the autocorrelation fluction $r_{xx}(\tau)$ corresponding to the frame of reference sampling signals 28 is generated, the feature extraction element 16, according to a selection criterion for the reference characteristic value, selects a set of $\tau$ values, $\tau_0 \sim \tau_{N_r}{}^{-1}$, to be the set of reference characteristic values 30. The selection criterion for the reference characteristic value is as follows:

$$r_{xx}(\tau) \geqq r_{xx}(\tau-1),\ r_{xx}(\tau) \geqq r_{xx}(\tau+1)$$

$$r_{xx}(\tau) \geqq \alpha^*(\mathrm{MAX}(r_{xx}(\tau)) - \mathrm{MIN}(r_{xx}(\tau))) + \mathrm{MIN}(r_{xx}(\tau))$$

$$\tau_{lowerbound} < \tau \leqq_{upperbound},$$

wherein $\alpha$ is a predetermined constant; MAX($r_{xx}(\tau)$) is the maximum value of the autocorrelation function $r_{xx}(\tau)$ under the condition that $\tau$ is not equal to 0; MIN($r_{xx}(\tau)$) is the minimum value of the autocorrelation function $r_{xx}(\tau)$ under the condition that $\tau$ is not equal to 0; $\tau_{lowerbound}$ is a predetermined lower bound of $\tau$, and $\tau_{upperbound}$ is a predetermined upper bound of $\tau$.

In this embodiment, the selection criterion for the reference characteristic value can select three largest values of the autocorrelation function $r_{xx}(\tau)$ under the condition that $\tau$ is not equal to 0, i.e. $N_r$=3. Because most of the pitches of melody is in the range of 100 Hz to 900 Hz, and this embodiment samples 1,024 samples for performing the autocorrelation calculation by 44.1 KHz, the range of $\tau$ values are between 49 (44,100/900=49) and 441 (44,100/100=441).

In the same way as mentioned above, after the autocorrelation function $r_{xx}(\tau)$ corresponding to the frame of target sampling signals 28 is generated, the feature extraction element 16, according to a selection criterion for the target characteristic value, selects a set of $\tau$ values, $\tau_0 \sim \tau_{N_m-1}$, to be a set of target characteristic values 32. In this embodiment, the selection criterion for the target characteristic value selects the maximum of the autocorrelation function $r_{xx}(\tau)$ under the condition that $\tau$ is not equal to 0, i.e. $N_m$=1.

Figure 2:
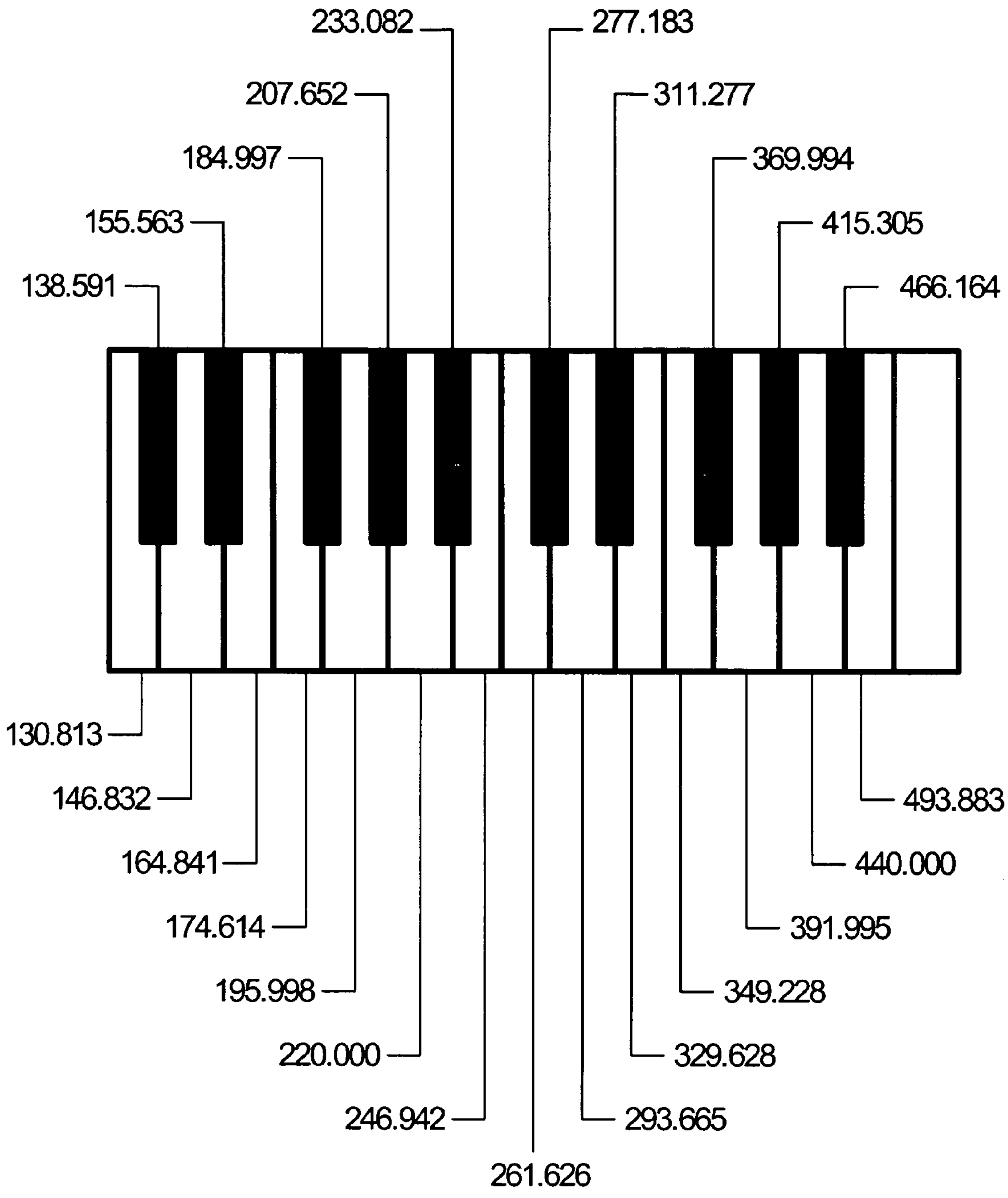
FIG. 2 is a schematic diagram of the central frequency of each pitch.
Figure 3:
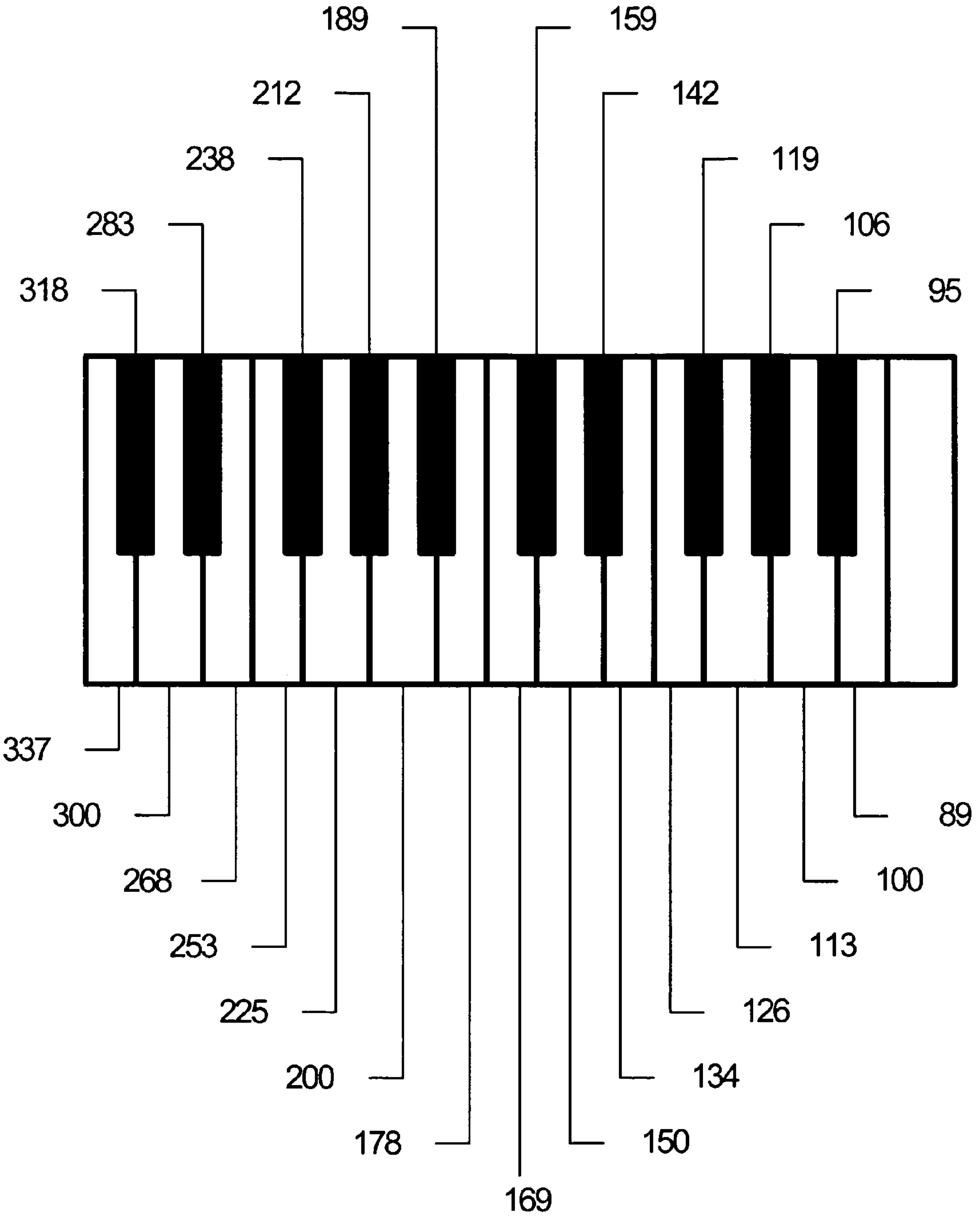
FIG. 3 is a schematic diagram of $\tau$ value corresponding to the central frequency of each pitch in FIG. 2, sampled by 44.1 KHz.

The feature extraction element 16 further comprises a feature buffer of reference input 35 for buffering the reference characteristic value 30. The reference audio input 24 is the stored musical data. According to experience, humans generally could not differentiate any variation in music within the range of 100 ms, so the feature buffer of reference input 35 stores characteristic values transformed from the reference audio input 24 within the range of 100 ms Referring to FIG. 2 and FIG. 3, FIG. 2 is a schematic diagram of the central frequency of each pitch, and FIG. 3 is a schematic diagram of τ value corresponding to the central frequency of each pitch in FIG. 2, sampled by 44.1 KHz. Each pitch has a corresponding central frequency. For example, the central frequency of middle C is 261.626 Hz. In this embodiment, the pitches are sampled by 44.1 KHz, so the τ value corresponding to the middle C is 169.

The reference audio input 24 and the target audio input 22 are audio signals, and both comprise a plurality of different pitches. The embodiment obtains quantified samples of the target vocal input and the reference vocal input according to the obtained τ value of the reference audio input 24 and the target audio input 22. As the above mentioned, Nr τ values of the reference characteristic values 30 are used for representing three pitches of the frame of the reference audio input 24. One τ value of the target characteristic value 32 is used for representing Nm pitch of the frame of the target audio input 22.

The similarity measurement element 18 in FIG. 1, according to the target characteristic values 32 and the reference characteristic values 30, is used for performing a similarity comparing procedure to generate a similarity result corresponding to the frame of reference sampling signal 28 and the frame of target sampling signal 26.

The similarity comparing procedure performs a subtraction process on the target characteristic values 32 and three reference characteristic values 30 respectively, and if any absolute value of the subtraction results is smaller than a predetermined threshold, the result of similarity is a "Hit"; otherwise, the result of similarity is a "Miss". This embodiment selects three reference characteristic values 30 from each frame of reference audio input 24, $N_r$=3, based on the reason that there may be a reference instrumental input and a reference vocal input mixed in the reference audio input 24, so the characteristics of the extracted pitch may comprise the pitch of accompaniment melody beside the pitch of the primary melody. In order to ensure that the selected pitch of the primary melody, usually being the reference vocal input, is standard enough to be the basis of calculating the similarity, the selected number is defined as three.

In different embodiments, the selected number of the target characteristic value 32 (Nm) and the selected number of the reference characteristic value 30 (Nr) could be changed according to different formats of the reference audio input 24. For example, if the musical source is an accompaniment CD or DVD, which stores the reference vocal input and the reference instrumental input separately, the system can sample the reference vocal input only, so that Nr is reduced. On the other hand, if the musical source is an old accompaniment tape, which only stores the reference instrumental input as the reference audio input 24, Nr is increased to select the pitch of each chord of the accompaniment melody, wherein Nr comprises the pitch of primary melody for scoring the target vocal input 22. According to the experimental result, this embodiment considers the musical CD that mixes the reference vocal input with the reference instrumental input, and better scoring results may be obtained when Nr=3.

It is noted that the selected number of the target characteristic value 32 and the reference characteristic value 30 could be different according to different embodiments, and the above disclosure should be construed as limited only by the metes and bounds of the appended claims.

The thresholds given in the above are different according to different pitches. Each τ of the set of reference characteristic values 30 has a corresponding threshold ($TH_\tau$), which is obtained by the following equation:

$$TH_\tau = \left| \frac{FS}{|FC_{upper} + FC|\frac{1}{2}} - \frac{FS}{|FC_{upper} + FC|\frac{1}{2}} \right| \frac{1}{2} = \left| \frac{FS}{|FC_{upper} + FC|} - \frac{FS}{|FC_{upper} + FC|} \right|$$

wherein FS represents a predetermined sampling frequency (FS is 44.1 KHz in this embodiment); FC represents the central frequency of the corresponding pitch of τ, and $FC_{upper}$ and $FC_{lower}$ respectively represent the central frequency of two adjacent pitches of the corresponding pitch of τ. For example, as shown in FIG. 3 and FIG. 2, if a reference characteristic value with τ of 169 is corresponding to the frequency of 261.626 KHz, the corresponding threshold is 44100/|1/(293.665+261.626)−1/(246.942+261.626)|=7.296.

The scoring element 20 shown in FIG. 1 is used for calculating the similarity results corresponding to the plural frames of sampling signals to output a final score 34. The scoring element 20 comprises a hitcount module 36 and a misscount module 38. The hitcount module 36 cumulatively calculates the Hits according to the result of similarity, transmitted from the similarity measurement element 18, and outputs a hitcount value, which is represented as HitCount. The misscount module 38 cumulatively calculates the Misses according to the result of similarity and outputs a misscount value, which is represented as MissCount.

The final score 34 is between a predetermined maximum score ($Score_{Max}$) and a predetermined minimum score ($Score_{Min}$), which is calculated by the following equation:

$$FinalScore = (Score_{\mathrm{MAX}} - Score_{\mathrm{Min}})\frac{HitCount}{MissCount + HitCount} + Score_{\mathrm{Min}}$$

Therefore, the karaoke scoring apparatus 10 can compare the target audio input 22 with the reference audio input 24 to generate the final score 34.

The hitcount module 36 cumulatively calculates the Hits according to the result of similarity from the similarity measurement element 18. When the result of similarity is a Hit, the hitcount module adds a hit-increase value, which is represented as HitIncrease, to the present HitCount for generating a renewed HitCount; at the same time, it replaces the MissCount by a default value. When the results of similarity are continually all Hits, the HitIncrease also increases. In other words, when the pitches of one frame of the target audio input 32 conform to the pitches of the reference audio input 24 continually, the karaoke scoring apparatus 10 will show a higher score.

In the same way as mentioned above, when the result of similarity is a Miss, the misscount module adds a miss-increase value, which is represented as MissIncrease, to the present MissCount for generating a renewed MissCount; at the same time, it replaces the HitCount by a default value. When the results of similarity are continually all Misses, the MissIncrease also increases.

In another embodiment, the similarity comparing procedure performed by the similarity measurement element 18 may be preformed in the following method. The reference audio input 24 and the target audio input 22 comprise plural pitches. Each pitch has a corresponding central frequency and a predetermined frequency range. The similarity comparing procedure is used for finding out if the corresponding frequencies of the set of reference characteristic values and the set of target characteristic values are in the same predetermined frequency range, so as to generate the similarity result. For example, as shown in FIG. 3 and FIG. 2, the reference characteristic value with a $\tau$ of 169 is corresponding to the frequency of 261.626K, so the corresponding frequency range is between (246.942+261.626)/2=254.284 KHz and (277.183+261.625)/2=269.404 KHz. In this embodiment, if the frequency corresponding to the target characteristic value is in this frequency range (254.284 KHz~269.404 KHz), it is a Hit; otherwise, it is a Miss.

According to the embodiments, the karaoke scoring apparatus 10 could extract the characteristics of the pitches of the primary melody in the reference audio input 24 for scoring the target audio input 22. The karaoke scoring apparatus can further transform the extracted audio input into corresponding quantified characteristics to be compared in detail. Moreover, the karaoke scoring apparatus provides a reasonable scoring standard, so that when a singer sings with the karaoke system, there will be different scores corresponding to Hit, Miss, continual Hit, continual Miss in the pitches of each frame of audio input. If the level of continual Hit or continual Miss is different, the scores being added or deducted is also different. Therefore, the present invention provides a karaoke scoring apparatus for scoring the performance of a singer precisely in a karaoke system. Furthermore, the karaoke scoring apparatus of the present invention has a reasonable scoring standard.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A karaoke scoring apparatus for scoring the performance of a singer with a karaoke system, the karaoke system comprising a predetermined reference audio input and being capable of accepting a target audio input compared with the reference audio input for giving a score by the karaoke scoring apparatus, the karaoke scoring apparatus respectively sampling the reference audio input and the target audio input, and sequentially transforming the reference audio input and the target audio input to a plural frames of reference sampling signals and a plural frames of target sampling signals, the karaoke scoring apparatus comprising:

a memory element for temporarily storing at least one frame of reference sampling signal and at least one frame of target sampling signal;

a feature extraction element for performing an autocorrelation calculation on the frame of reference sampling signal temporarily stored in the memory element and the plural frames of reference sampling signals that are differently delayed to generate a set of reference characteristic values, the feature extraction element for performing the autocorrelation calculation on the frame of target sampling signal temporarily stored in the memory element and the plural frames of target sampling signals that are differently delayed to generate a set of target characteristic values;

a similarity measurement element, according to the set of target characteristic values and the set of reference characteristic values, for performing a similarity comparing procedure to generate a similarity result corresponding to the frame of reference sampling signal and the frame of target sampling signal; and a scoring element for calculating the similarity results corresponding to the plural frames of sampling signals to output a final score.

2. The karaoke scoring apparatus of claim 1, wherein the predetermined reference audio input comprises a reference instrumental input and/or a reference vocal input, and the target audio input is a target vocal input sang by the singer via a microphone.

3. The karaoke scoring apparatus of claim 1, wherein the memory element comprises a first register and a second register, the karaoke scoring apparatus sequentially transforms the reference audio input to a plural frames of corresponding reference sampling signals for temporarily storing in the first register, and the karaoke scoring apparatus sequentially transforms the target audio input to a plural frames of corresponding target sampling signals for temporarily storing in the second register.

4. The karaoke scoring apparatus of claim 3, wherein the predetermined sampling frequency is 44.1 KHz substantially, and each frame of reference sampling signal and each frame of target sampling signal have N samples respectively, N=1024.

5. The karaoke scoring apparatus of claim 4, wherein each frame of sampling signal can be represented as X(k), k=0~N−1, and is able to be delayed as X(k+$\tau$) via different delay time $\tau$, and the autocorrelation calculation performs a predetermined calculation on X(k) and X(k+$\tau$) to obtain an autocorrelation function $r_{xx}(\tau)$, the predetermined calculation is $$r_{xx}(\tau) = \frac{1}{N}\sum_{k=0}^{N-1} x(k)\cdot x(k+\tau).$$

6. The karaoke scoring apparatus of claim 5, wherein when the autocorrelation function $r_{xx}(\tau)$ corresponding to the frame of reference sampling signals is generated, the karaoke scoring apparatus, according to a selection criterion for the reference characteristic value, selects a set of $\tau$ values, $\tau_0 \sim \tau_{N_r-1}$, to be the set of reference characteristic values, the selection criterion for the reference characteristic value is as the following:

$$r_{xx}(\tau) \geqq r_{xx}(\tau-1),\ r_{xx}(\tau) \geqq r_{xx}(\tau+1)$$

$$r_{xx}(\tau) \geqq \alpha(\mathrm{MAX}(r_{xx}(\tau)) - \mathrm{MIN}(r_{xx}(\tau))) + \mathrm{MIN}(r_{xx}(\tau))$$

$$\tau_{lowerbound} < \tau \leqq \tau_{upperbound},$$

wherein $\alpha$ is a predetermined constant, $\mathrm{MAX}(r_{xx}(\tau))$ is the maximum value of the autocorrelation function $r_{xx}(\tau)$ under the condition that $\tau$ is not equal to 0, $\mathrm{MIN}(r_{xx}(\tau))$ is the minimum of the autocorrelation function $r_{xx}(\tau)$ under the condition that $\tau$ is not equal to 0, $\tau_{lowerbound}$ is a predetermined lower bound of $\tau$, and $\tau_{upperbound}$ is a predetermined upper bound of $\tau$.

7. The karaoke scoring apparatus of claim 6, wherein the selection criterion for the reference characteristic value selects 3 largest values of the autocorrelation function $r_{xx}(\tau)$ under the condition that $\tau$ is not equal to 0, i.e. $N_r=3$, and the range of $\tau$ is between 49 and 441.

8. The karaoke scoring apparatus of claim 5, wherein when the autocorrelation function $r_{xx}(\tau)$ corresponding to the frame of target sampling signals is generated, the karaoke scoring apparatus, according to a selection criterion for the target characteristic value, selects a set of $\tau$ values, $\tau_0 \sim \tau_{N_m-1}$, to be the set of target characteristic values.

9. The karaoke scoring apparatus of claim 8, wherein the selection criterion for the target characteristic value selects the maximum of the autocorrelation function $r_{xx}(\tau)$ under the condition that $\tau$ is not equal to 0, i.e. $N_m=1$.

10. The karaoke scoring apparatus of claim 5, wherein the similarity comparing procedure performs a subtraction process between the set of target characteristic values and the set of reference characteristic values respectively, and if any absolute value of the subtraction results is smaller than a predetermined threshold, the result of similarity is a "Hit", otherwise the result of similarity is a "Miss".

11. The karaoke scoring apparatus of claim 10, wherein the reference audio input and the target audio input both comprise a plural audio of different pitches, each pitch has a corresponding central frequency and corresponds to at least one $\tau$, and each $\tau$ of the set of reference characteristic values has a corresponding threshold ($TH_\tau$) which is obtained by the following equation:

$$TH_\tau = \left| \frac{FS}{|FC_{upper} + FC|\frac{1}{2}} - \frac{FS}{|FC_{upper} + FC|\frac{1}{2}} \right| \frac{1}{2} = \left| \frac{FS}{|FC_{upper} + FC|} - \frac{FS}{|FC_{upper} + FC|} \right|,$$

wherein FS represents a predetermined sampling frequency, FC represents the central frequency of the corresponding pitch of $\tau$, and $FC_{upper}$ and $FC_{lower}$ respectively represent the central frequency of two adjacent pitches of the corresponding pitch of $\tau$.

12. The karaoke scoring apparatus of claim 10, wherein the scoring element comprises a hitcount module and a misscount module, the hitcount module cumulatively calculates the Hits according to the result of similarity and outputs a hitcount value which is represented as HitCount, the misscount module cumulatively calculates the Misses according to the result of similarity and outputs a misscount value which is represented as MissCount, and the final score is between a predetermined maximum score ($Score_{Max}$) and a predetermined minimum score ($Score_{Min}$), which is calculated by the following equation:

$$FinalScore = (Score_{MAX} - Score_{Min})\frac{HitCount}{MissCount + HitCount} + Score_{Min}.$$

13. The karaoke scoring apparatus of claim 12, wherein while the result of similarity is Hit, the hitcount module adds a hit-increase value to the present HitCount, which is represented as HitIncrease for generating a renewal HitCount, and replaces the MissCount by a default value, and while the results of similarity all are Hits continually, the HitIncrease increases.

14. The karaoke scoring apparatus of claim 12, wherein while the result of similarity is Miss, the misscount module adds a miss-increase value to the present MissCount, which is represented as MissIncrease for generating a renewal MissCount, and replaces the HitCount by a default value, and while the results of similarity all are Misses continually, the MissIncrease increases.

15. The karaoke scoring apparatus of claim 5, wherein the reference audio input and the target audio input both comprise a plural audio of different pitches, each pitch has a corresponding central frequency and a predetermined frequency range, and the similarity comparing procedure looks for that whether the corresponding frequencies of each the set of reference characteristic values and the set of target characteristic values are in the predetermined frequency range of the same pitch for generating the result of similarity.

* * * * *